June 1, 1948. H. K. WEISS 2,442,389
DEVICE FOR IMPROVING MANUAL CONTROL
Filed March 10, 1943 2 Sheets-Sheet 1
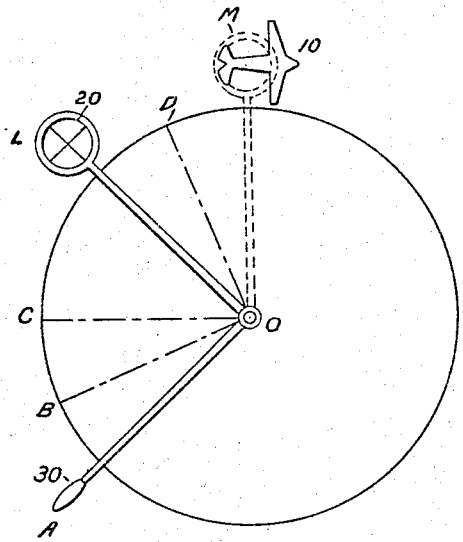
Fig.-1-
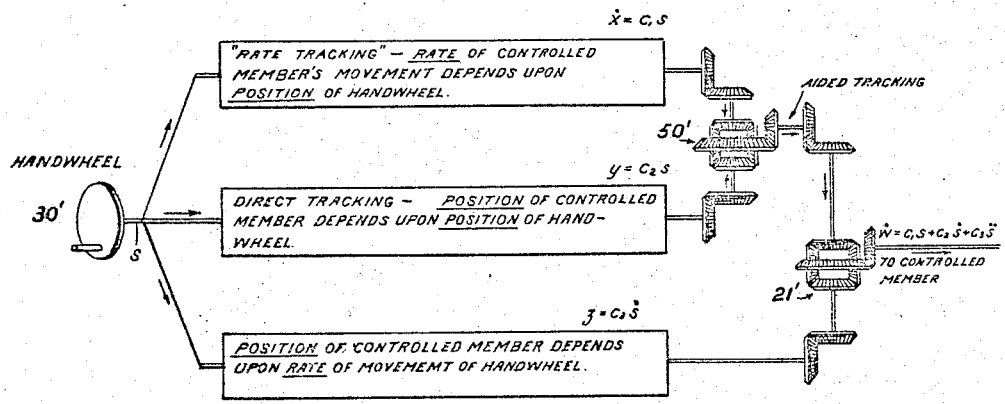
Fig.-2-
Inventor
Herbert K. Weiss
By C. E. Herrstrom & H. E. Thibodeau
Attorneys June 1, 1948.  H. K. WEISS  2,442,389
DEVICE FOR IMPROVING MANUAL CONTROL
Filed March 10, 1943  2 Sheets-Sheet 2
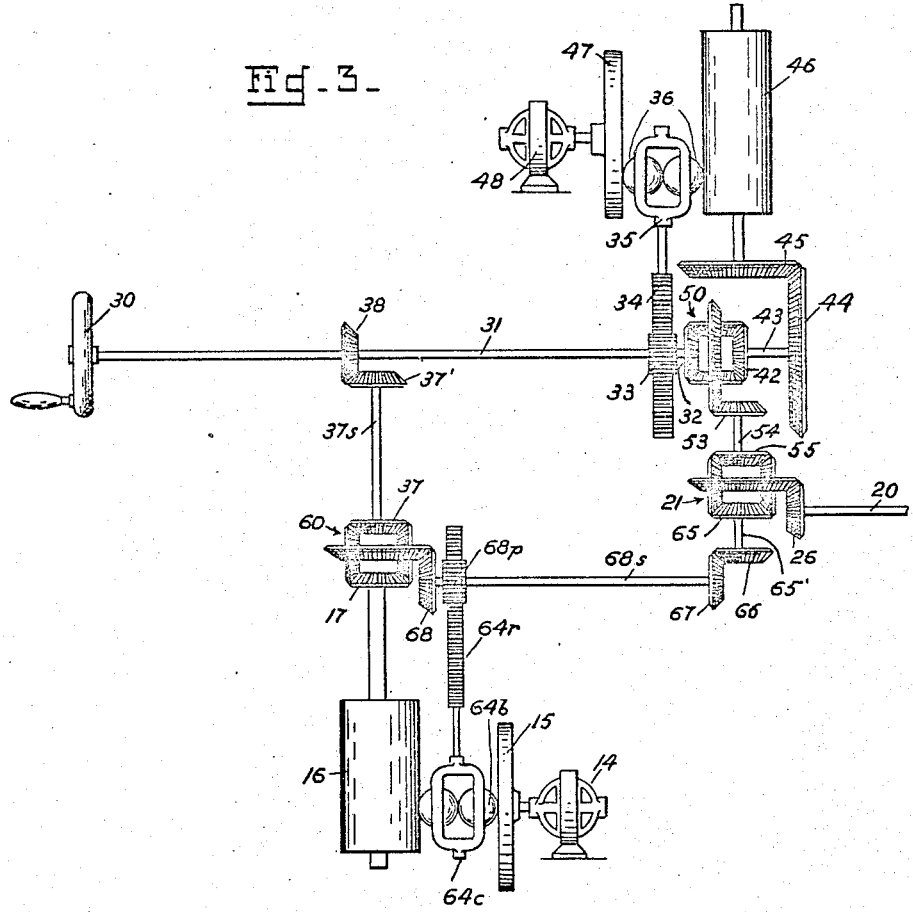
Fig-3-
Inventor
Herbert K. Weiss

Patented June 1, 1948

2,442,389

UNITED STATES PATENT OFFICE 2,442,389

DEVICE FOR IMPROVING MANUAL CONTROL

Herbert K. Weiss, Camp Davis, N. C.

Application March 10, 1943, Serial No. 478,655

9 Claims. (Cl. 74—388)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a device for improving the rapidity, sensitivity and other characteristics of manual controls, such as the type used in fire control of firearms and in various commercial devices, in which a human operator is required to perform a matching, zeroing, or following operation by turning or adjusting a handwheel, lever, knob, or other control device. The improved device finds numerous applications, only two of which may be mentioned by way of example, viz., the control of a tracking instrument for antiaircraft fire control in which the operator by turning a handwheel endeavors to keep a cross hair of a tracking telescope on a moving target, and to the range finding operations of radio ranging devices in which an indication of a cathode ray oscilloscope screen is maintained in some particular position or relative amplitude.

The improved device will be described herein in connection with a "tracking" operation, in which the operator by moving a manual control (such as a lever, handwheel, or the like) keeps the cross-hair of a tracking telescope on a moving target. Three types of tracking devices may be described, namely, "direct tracking," "rate tracking," and "aided tracking." In direct tracking the movement of the tracking telescope is directly proportional to the movement of the control handwheel, although the tracking telescope may move at a rate reduced relative to the rate of handwheel turning or "geared down" or at an enhanced rate or "geared up." For convenience in the following exposition the member manipulated by the operator will continue to be termed "handwheel," but the member which is adjusted, regulated, or controlled by the handwheel will be termed the "controlled member."

In devices employing "direct tracking" the operator must expand power, through the handwheel, to adjust or move the "controlled member." While the amount of power expended by the operator is relatively not great, yet it becomes a serious handicap in the case of rapidly moving targets because of the rapid changes required in both the handwheel and the controlled member, and results in increasing lag between the operator's visual perception and the adjusted controlled member. The ability of the operator to make a sensitive and accurate adjustment is also hindered by the fact that he must continuously turn the handwheel, frequently at high rates of speed. These defects are in large measure rectified in devices employing "rate tracking," in which a power drive is provided the output of which is connected to the controlled member to move or adjust it, the rate of which output is under control of the handwheel. Hence the operator controls the rate output of the power drive (or the rate of adjustment of the controlled member) by merely altering the position of the handwheel.

The third type of tracking "aided tracking" is a combination of "direct tracking" and "rate tracking" in which the handwheel changes by direct connection, the position of the controlled member (as in "direct tracking") and also changes, indirectly through control of output of a power drive, the rate of change or adjustment (of position) of the controlled member (as in "rate tracking"). The advantages of aided tracking over rate tracking will be apparent from the following discussion: Two different rates should be distinguished, namely, the "rate of target" and of "power output," which is the rate of adjusting movement of the controlled member. In order that the controlled member (i. e., the hair line of the telescope) may catch up with or "come up to" the target, the rate of power output must be greater than the target rate. This leads to "overshooting." In the case of position tracking, there is less overshooting than with rate tracking, for the operator perceives the position effect of his control adjustments immediately, provided they are of a size to be perceptible; but even in this case, the fact that the operator cannot make an immediate muscular response to his visual perception of an error, and his inherent difficulty in superimposing small monitoring adjustments on the steady and continuous following rate which he must set up by arm and hand movement, cause continuous hunting back and forth about the true target position. Aided tracking in large measure eliminates the defect of excessive overshooting noted above as inherent in rate tracking by introducing the corrective effect (with respect to overshooting) of position tracking.

While rate tracking (and aided tracking) greatly reduce operator lag (especially in the case of a rapidly moving target), even here, lag of the operator in correcting errors causes continuous hunting about the true target position, this hunting being of a period from ten to twenty seconds.

While one of the objects of this invention is to still further improve the operation of devices employing aided tracking, it is understood that the invention may be applied to devices employing rate tracking or position tracking. It was merely for purposes of illustration that the invention has been described in connection with the aided tracking arrangement shown in the figures. It is to be understood that applicant's invention for improving human control may be applied to any type of tracking system and, for that matter, to any device in which a human operator is required to perform a matching, zeroing, or following or the like operation. The invention may be applied to tracking systems automatically accommodated to targets moving with constant velocity, constant acceleration or with changing acceleration. For example, applicant's improved human control may be applied to the tracking arrangement shown in the Papello Patent #2,071,424, which is implemented with means for tracking an accelerating target (either constant or variable). This object of invention is to still further eliminate lag, and to prevent overshooting. For the attainment of these and such other objects as may herein appear or be pointed I have shown a number of embodiments of my invention in the accompanying drawing, wherein:

Fig. 1 is a diagram explaining the principles underlying my invention.

Fig. 2 is a "flow diagram" explaining the direction and combining of various forces, power outputs etc.

Fig. 3 is a schematic lay-out of mechanical apparatus for carrying out my improved system.

The basic principles of my invention will first be explained with the aid of the diagram shown in Figure 1. In this figure, 10 represents the target, 20 the controlled member (as defined above) and 30 the handwheel or control element (also as defined above); all three are pivotly mounted on axis 0. The figure diagrammatically represents a tracking device in which the target 10 turns in a clockwise direction and is pursued by the control member 20, the movement of which is controlled by handwheel 30. Then if only "direct" tracking were present, the operator would be required to advance his handwheel through angle AOC in order to advance the controlled member through angle LOM to come "on target."

It will be recalled from the above discussion of direct, rate, and aided tracking, that in direct tracking the position of the controlled member depends directly upon the position of the handwheel; that in rate tracking, the rate or movement of the controlled member depends upon the position of the handwheel (while in aided tracking, both the position and the rate of movement of the controlled member depends upon handwheel position). In the improved device of this invention, still another component is added in which the position of the controlled member depends upon the rate of adjustment of the handwheel. It may be observed that this is in a sense opposite to rate tracking in which the position of the handwheel establishes the rate of movement of the controlled member. The component added by the device of this invention (causing the position of the controlled member to depend upon rate of handwheel adjustment) introduces for the first time a factor which takes into account the "personal equation" of the operator, more particularly, the speed with which he manipulates the handwheel.

The position of the controlled member 20, Figure 1 according to this invention will also depend upon the rate at which handwheel 30 is adjusted.

In moving from position A to position B suppose for the purpose of the description that the rate of movement of handwheel 30 is fairly constant and that the target is motionless, although it will readily be seen that these are not necessary conditions of operation. The controlled member 20 will then be advanced (by the component of the improved device) in the same direction as the rate of change of adjustment (clockwise) by an amount proportional to the rate, so that as indicated in Figure 1, when the handwheel has moved through an angle AOB, the controlled member has moved through an equal angle LOD plus an additional angle DOM proportional to the rate of movement of the handwheel and member L is "on target." As the operator then reduces his rate of moving handwheel 30, the added angle DOM is reduced proportional to the rate, so that by the time the operator has moved his handwheel to the position OC such that angle AOC is equal to angle LOM for the case assumed of a fixed target, handwheel A may be brought to rest and member M will remain "on target."

It is to be noted especially that the controlled member was "on target" in the case of this improved device when the handwheel had been moved through angle AOB and that subsequent movement of handwheel A was required merely to maintain this position whereas in the customary type of position tracking the control handwheel 30 must be moved through the full angle AOC before the control member M is "on target." As the increment DOM is proportional to the rate of movement of handwheel 30 it follows that the time required to put the control member "on target" with the improved type of control can be made many times shorter than with a simple "direct" type of control, and that this advantage will be present for all operators with additional advantage for the operator most quickly able to apply a rate to the handwheel 30.

It is further true, that the instant the operator stops turning this type of control, the added component disappears so that any erratic adjustment immediately perceived could be wiped out in such a small period of time that it would not affect the circuits to which tracking data is supplied.

Correspondingly, in coming up on a target, the operator would stop turning his control upon reaching the target. With conventional control of rate and also for aided tracking, this procedure would cause overshooting, and the operator is required to learn through training to anticipate such adjustments. The improved control device of this invention prevents overshooting for the following reasons: It was noted in Figure 1 that as the operator brought his handwheel to a stop, the magnitude of the added component of the improved control decreased. Hence, should the operator decrease the speed of turning of his handwheel with sufficient rapidity (high deceleration), the motion of the controlled member M would be caused to reverse direction (i. e., travel counterclockwise) without the necessity for reversing the direction of the handwheel A. Thus, with the proposed or "inhibiting" component of control, although the operator may, through his own lag actually overshoot the target, he need not reverse or "back off" his control but need only bring it to a stop, whereupon the controlled member will move backwards in position an amount proportional to the rate at which the handwheel had been turned. This is a consequence of the fact that as the rate of the handwheel is brought to zero the added movement introduced by the improved control is removed, being zero for zero handwheel rate.

Of course, in a practical case, adjustment would not be this crude, but approach would be by a series of small adjustments practically or actually continuous. It should be emphasized that this inhibiting component should only be used superimposed on a control containing already a position or rate component, or both, and its amount should be adjusted by trial and error to determine the amount of "inhibition" required to offset the operator's lag without making the control unduly sensitive.

Fig. 2 shows the flow of data in a possible aided tracking type of control upon which an "inhibiting" component has been superimposed. Adjustment is made through the operator's handwheel 30' (the angular position of which is designated s in Fig. 2), a portion of this adjustment going straight through adding differentials 50' and 21' to the controlled member. This is "direct tracking," diagrammatically indicated by the center diagram box and mathematically represented by the equation $y=c_2 s$. The same adjustment is applied to the "rate tracking" unit (diagrammatically indicated by the upper diagram box) whose output shaft turns at a rate proportional to the position of the handwheel (mathematically represented by the equation $x=c_1 s$ where $x$ is the first derivative of $x$ with respect to time). The operator's adjustment is also supplied to a rate measuring unit (diagrammatically indicated by the lower diagram box) whose output shaft assumes a position which is a measure of the rate of change of the handwheel adjustment (mathematically represented by the equation $z=c_3 \dot{s}$). The component of "direct tracking," "rate tracking" and the position output of the rate measuring unit (lower diagram box) are added together by adding differentials 50' and 21', and the sum which is a rate (W) proportional to the position $(c_1 s)$ rate $(c_2 \dot{s})$, and acceleration $(c_3 \ddot{s})$ of the handwheel is applied to the controlled member (mathematically, $$\dot{W}=c_1 s+c_2 \dot{s}+c_3 \ddot{s})$$

The invention may be carried out by mechanical, electrical, hydraulic, pneumatic and other means. Merely by way of illustration one form of mechanical means is shown in Fig. 3. The handwheel 30 drives the controlled member 20 through the bevel gear 32 secured on handwheel shaft 31. Bevel gear 32 constitutes one-half of a differential 50, the output gear of which 53 is connected by short spindle 54 to bevel gear 55 which constitutes one-half of a second differential 21, the output bevel gear of which 26 is secured on controlled member 20.

The "rate tracking" component is added to the "direct tracking" at the differential 50 by means of a bevel gear 42 which constitutes the other half of the differential 50. Bevel gear 42 and a second bevel gear 44 are secured on a short spindle 43; the said second bevel gear 44 meshes with a bevel gear 45 secured to rotate with the cylinder 46 of a variable speed device. Cylinder 46 is rotated from a flat disc 47 driven by a constant speed motor 48 through friction balls 36 carried in a cage 35. Ball cage 35 is adjustably positioned radially to the friction disc 47 to regulate the speed transmitted to cylinder 46, by means of a rack 34 to which the cage is secured; said rack meshes with a pinion gear 33 on shaft 31. Hence the position of the ball cage under control of the handwheel 30 will determine the rate at which the controlled member 20 is moved, through variable speed device 47, 36, 46.

The component of the improvement of this invention (in which, as explained above, the position of the controlled member is made to depend upon rate of handwheel adjustment) is introduced at the said differential 21 by a bevel gear 65 secured together with a second bevel gear 66 to a short spindle 65'. The said second bevel gear 66 meshes with a bevel gear 67 secured on a shaft 68s at the other end of which is the output bevel gear 68 of a differential 69. One of the input bevels 37 of differential 69 is driven from the handwheel shaft 31 by bevels 38, 37' and shaft 37s. The other input bevel 17 is secured to rotate with cylinder 16 which is driven from a friction disc 15 (rotated by constant speed motor 14) through friction balls 64b carried by cage 64c. The radial position of the ball cage relative to friction disc 15 is adjusted by a rack 64r to which the ball cage is secured, the rack being connected to a pinion gear 68p on the said shaft 68s.

Suppose the ball carriage 64c is in its central point relative to friction disc 15 (zero speed position of the output cylinder 16). If handwheel 30 is now turned, only its half (namely, bevel 37) of differential 69 will turn (the other bevel 17 being stationary).

Therefore the turning of bevel 37 will be transmitted through output bevel 68 and shaft 68s to the controlled member 20 (via the afore-described differential 21). But the turning of output shaft 68s will adjust the radial position of ball carriage 64c (by pinion 68p and rack 64r, as described), so that the cylinder 16 now begins to turn. The ball carrier will be adjusted until the speed of the cylinder 16 (rather, its differential bevel gear 17) equals that of the other differential bevel gear 37, which is turned by the handwheel 30. It is thus evident that output shaft 68s will thereafter turn only when there is a change in the speed of the handwheel shaft 31, and hence the position of shaft 68s will depend upon the rate of turning of shaft 31, i. e., the rate of handwheel adjustment.

Although all of these components have been discussed as if they bore a linear relationship to the position of handwheel 30, this is not a desired limitation of this invention, for it is probable that experiment will show a non-linear dependence of the three components of control (i. e., direct, rate, and "inhibited") on position of handwheel 30 to be most desirable in fitting the parameter of the improved control to the "personal equation" of the operator.

I claim:

1. In devices of the class described having a handwheel and a controlled member, the combination of a differential, means for operatively connecting one of the input gears thereof with the said handwheel, a variable speed means having a constant speed motor and a positionable element, means for operatively connecting the output shaft thereof with the other of the input gears of the differential, means controlled by the handwheel for adjusting the positionable element of the said variable speed means, a second differential, means for operatively connecting one of the input gears thereof with the said handwheel, a second variable speed means having a constant speed motor and a positionable element, means for operatively connecting the output shaft thereof with the other input gear of the said second differential, a third differential, means operatively connecting the output gear of the said first differential with one of the input gears of the said third differential, means operatively connecting the output gear of the said second differential with the other of the input gears of the third differential, means controlled from the said connection between the second and third differential for adjusting the said positionable element of the said second variable speed means, and means for connecting the output of the said third differential with the said controlled member.

2. In combination, a member whose position is to be controlled, and means for altering the position of said member comprising a manipulator, a connection between said manipulator and the member constructed and arranged for changing the position of the member in proportion to a change of position of the manipulator, a second connection between the manipulator and the member for changing the rate of change of position of the member in proportion to the change of position of the manipulator and a third connection between the manipulator and the member constructed and arranged for changing the position of the member to an amount proportional to the instantaneous value of the rate of change of position of the manipulator.

3. In combination, a member whose position is to be controlled and means for altering the position of said member comprising a manipulator, a connection between said manipulator and said member constructed and arranged for altering the position of said member in proportion to a change of position of the manipulator, a second connection between said manipulator and said member comprising means for independently and automatically turning the member, said means comprising a differential connection for limiting the speed of said means for an output to said member of a rate proportional to the position of said manipulator, and a third connection between said manipulator and said member for changing the position of said member, said third connection comprising differential means for limiting the ultimate change of position of said member occasioned by said third connection to a value proportional to the corresponding instantaneous value of the speed of the manipulator.

4. In a control system, a displaceable control element, a movable member whose position is to be controlled, a first device means operating said first device by and in proportion to the displacement of said element to produce a first measurable output having an instantaneous value proportional to said displacement, a second device means operating said second device by and in proportion to the displacement of said element to produce a second measurable output having an instantaneous value proportional to the rate of displacement of said element for both directions of displacement thereof, means responsive to the operation of said first and second devices to produce a third measurable output proportional to the algebraic sum of said first and second outputs, and a connection between said last named means and said member operating said member proportional to the instantaneous value of said third output.

5. In combination, a control element displaceable from an initial position, a member whose movement is to be controlled, a first part means operating said first part from said element in direct proportion to the total displacement of said element from said initial position, a second part, a variable speed drive having a speed-varying unit and an output portion driven by said unit, means connecting said unit for adjustment by said second part, first differential means connected with said element, output portion and second part to adjust said second part and unit in proportion to the difference in displacements of said element and output portion, and second differential means connecting said first and second parts and said member to move said member in proportion to the algebraic sum of the movements of said parts.

6. In a control system, a displaceable control element, a movable member whose position is to be controlled, and means for altering the position of said member by and in response to characteristics of movement of said element, said means comprising a first part means driving said first part from said element to produce a first measurable output having an instantaneous value proportional to the displacement of said control element, a second part means driving said second part in response to displacement of said element to produce a second measurable output having an instantaneous value directly proportional to the rate of displacement of said control element, means responsive to operation of said first and second parts to produce a third measurable quantity proportional to the algebraic sum of said first and second outputs, and a driving connection between said last-named means and said movable member.

7. In a control system, a control element displaceable from an initial position, a movable member to be controlled, a first part operable by and in proportion to total displacement of said control element from said position, a second part, first variable speed means controlled by said element and connected to operate said second part at a rate proportional to said total displacement of said element, a third part, second variable speed means controlled by said element to operate said third part at a rate proportional to the rate of change of displacement of said element, and differential means driven by said first, second and third parts to actuate said member in response to and proportional to the algebraic sum of the total movements of said parts.

8. In a control system, a displaceable control element, a movable member whose position is to be controlled, and means for altering the position of said member in response to movement of said element, said means comprising a first part means moving said first part by and in proportion to the movement of said element, a second part means moving said second part at a rate proportional to the displacement of said element, a third part means moving said third part at a rate proportional to the rate of change of movement of said element, means algebraically combining the said movements of said first, second and third parts, and a driving connection between said last-named means and said movable member.

9. In a control system, a control element movable from an initial position, first means responsive to movement of said element from said initial position to produce a first movement proportional to the total displacement of said element from said position, second means responsive to the rate of change of movement of said element to produce a second movement proportional to said rate of change of movement of said element in either of two opposite directions, differential means, means connecting said first and second means to respective first and second sides of said differential means, said differential means having a third side operated in proportion to the algebraic sum of said movements, a movable controlled member, and a driving connection between said third side and said member.

HERBERT K. WEISS.

REFERENCES CITED

The following references are of record in the file of this patent:

UNITED STATES PATENTS

| Number | Name | Date |
|---|---|---|
| 710,045 | Day | Sept. 30, 1902 |
| 1,464,208 | Makaroff | Aug. 7, 1923 |
| 1,582,702 | Stoekle | Apr. 27, 1926 |
| 2,071,424 | Papello | Feb. 23, 1937 |
| 2,151,718 | Riggs | Mar. 28, 1939 |
| 2,159,181 | Ryder | May 23, 1939 |
| 2,176,102 | Riggs | Oct. 17, 1939 |
| 2,206,875 | Chafee et al. | July 9, 1940 |

FOREIGN PATENTS

| Number | Country | Date |
|---|---|---|
| 287,521 | Germany | Sept. 27, 1915 |
| 489,271 | Great Britain | July 22, 1938 |